3,251,779
CLEANING SOLUTION FOR GLASS
Harry W. Williams, 3411 1st St. NE.,
Calgary, Alberta, Canada
No Drawing. Filed Nov. 12, 1963, Ser. No. 323,080
3 Claims. (Cl. 252—170)

This invention relates to a cleaning solution which is primarily intended for cleaning glass and other similar materials such as porcelain. The solution is particularly suited for removing grime and dirt from windows.

There are a considerable number of known solutions for cleaning glass, many of which are now available on the consumer's market. One disadvantage of all or most of these glass cleaners is that they tend to leave a film or cloud on the cleaned surface of the glass which can readily be seen when the surface is viewed in bright sunlight. Another disadvantage of some of these cleaning solutions is that they are potentially inflammable. Still another disadvantage of many of these solutions is their harshness to the human skin or their harmful effects on clothing.

These disadvantages have been overcome in the present invention by providing a cleaning and polishing solution for glass and the like which does not leave a film or cloud thereon. In addition, this solution has little or no detrimental effects on the human skin or clothing and is not inflammable. The solution is also inexpensive and simple to produce.

The cleaning and polishing solution consists of water in a relatively pure form to which has been added a small and approximately equal amount of pinene, $C_{10}H_{16}$, and isopropyl alcohol, $(CH_3)_2CHOH$. It will be appreciated that water by itself does not provide a very satisfactory cleaning solution, particularly for windows which are subject to viewing in bright sunlight, since the water is unable to dissolve greasy grime, dirt and finger marks which are often present on the surface of the glass. The addition of detergents and many other cleaning agents to the water satisfactorily removes the greasy marks but tends to leave a streaky coating which can readily be seen when the glass is viewed in the sunlight. It has been found that the addition of approximately equal quantities of less than 1% pinene and isopropyl alcohol unexpectedly improves the cleaning power of the water without contributing other undesirable effects. Tests by the applicant have shown that only about 0.2% pinene and alcohol need be added to the water in order to provide an excellent cleaning solution for glass and the like. More particularly, a cleaning solution consisting of the following ingredients in the proportions shown was found to have superior cleaning characteristics over the commonly available glass cleaning solutions:

10 volumes of pinene
8 volumes of isopropyl alcohol
4500 volumes of water.

It can readily be seen that the above solution is inexpensive and easily produced, is not inflammable, and is not toxic to the skin or harmful to the clothing. It has been found that the best results are achieved when the ingredients are mixed in a relatively pure form.

What I claim as my invention is:

1. A solution for cleaning and polishing glass consisting of approximately 99.6% water, .2% pinene and .2% isopropyl alcohol the percentages being by volume.

2. A solution for cleaning and polishing glass consisting of approximately 10 volumes of pinene
8 volumes of isopropyl alcohol
4500 volumes of water.

3. A solution for cleaning and polishing glass consisting essentially of water, pinene and isopropyl alcohol the pinene being present in an amount of from about 0.2% to less than 1% and the isopropyl alcohol being present in an amount from about 0.2% to less than 1% the percentages being by volume.

References Cited by the Examiner
UNITED STATES PATENTS

| 2,437,857 | 3/1948 | Lister | 252—170 XR |
| 2,611,747 | 9/1952 | Heideman | 252—170 |
| 3,108,078 | 10/1963 | Wixon | 252—99 |

OTHER REFERENCES

John, Modern Polishes and Specialties, Chem. Publ. Co. (1942), pages 275, 276.
Hercules-Terpene Solvents (1942), p. 3.

ALBERT T. MEYERS, *Primary Examiner.*
JULIUS GREENWALD, *Examiner.*
W. SCHULZ, *Assistant Examiner.*